(12) United States Patent
Towner et al.

(10) Patent No.: US 12,007,733 B2
(45) Date of Patent: Jun. 11, 2024

(54) FLOATING MASTER CONTROLLER

(71) Applicant: SIEMENS ENERGY, INC., Orlando, FL (US)

(72) Inventors: Stephen Towner, Cypress, TX (US); Trung Nguyen, Sugar Land, TX (US); Amit Saxena, Katy, TX (US)

(73) Assignee: Siemens Energy, Inc., Orlando, FL (US)

( * ) Notice: Subject to any disclaimer, the term of this patent is extended or adjusted under 35 U.S.C. 154(b) by 53 days.

(21) Appl. No.: 17/707,058

(22) Filed: Mar. 29, 2022

(65) Prior Publication Data

US 2023/0315035 A1  Oct. 5, 2023

(51) Int. Cl.
*G05B 19/042*  (2006.01)
(52) U.S. Cl.
CPC .... *G05B 19/042* (2013.01); *G05B 2219/2238* (2013.01)
(58) Field of Classification Search
CPC .............. G05B 19/042; G05B 2219/2238
USPC ....................................................... 709/209
See application file for complete search history.

(56) References Cited

U.S. PATENT DOCUMENTS

2018/0225244 A1*  8/2018  Dorneanu ............. G06F 13/374
2023/0185263 A1*  6/2023  Klein ................... G05B 19/042
                                                                    700/28

FOREIGN PATENT DOCUMENTS

CN           112486740 A  *  3/2021  .......... G06F 11/2092

* cited by examiner

*Primary Examiner* — Michael W Choi (57) ABSTRACT

A floating master controller system is provided that includes a plurality of hardware units, each capable of carrying out at least one mechanical function. Each hardware unit includes a processor configured via controller code included in a memory to cause the respective hardware unit to operate and carry out the at least one mechanical function. The controller code for each hardware unit includes a master controller (MC) application and at least one floating master controller (FMC) application. Each MC application is operably configured to function as an active master controller that controls the at least one mechanical function in each of the plurality of hardware units in the system and is operably configured to control the at least one mechanical function for its respective hardware unit responsive to tracking another one of the MC applications that is functioning as the active master controller in the system. Also, the at least one FMC application for each hardware unit is operably configured to automatically coordinate with each other FMC application to move active master controller functionality for the system between each of the different MC applications in the system.

18 Claims, 8 Drawing Sheets

FLOATING MASTER CONTROLLER

TECHNICAL FIELD

The present disclosure is directed, in general, to controllers for hardware units, in particular master controllers capable of controlling the actions of multiple compressors, pumps, motors, or other types of hardware units.

BACKGROUND

Master controllers are used to facilitate controlling multiple hardware units (e.g., electro/mechanical devices) operating concurrently in a system. The master controller determines control data required by each hardware unit and transmits the appropriate control data to each of them. Such systems that employ master controllers may benefit from improvements.

BRIEF SUMMARY

Variously disclosed embodiments include data processing systems and methods that may be used to facilitate implementing floating master controllers in a system of hardware units. In one aspect, a floating master controller system may include a plurality of hardware units, each capable of carrying out at least one mechanical function. Each hardware unit includes a processor configured via controller code included in a memory to cause the hardware unit to operate and carry out the at least one mechanical function. The controller code for each hardware unit may include a master controller (MC) application and at least one floating master controller (FMC) application. Each MC application is operably configured to function as an active master controller that controls each of the plurality of hardware units in the system. Also, each MC application is operably configured to control the at least one mechanical function for its respective hardware unit responsive to tracking another one of the MC applications that is functioning as the active master controller in the system. Further, the at least one FMC application for each hardware unit is operably configured to automatically coordinate with each other FMC application to move active master controller functionality for the system between each of the different MC applications in the system.

In another aspect, a floating master controller for a hardware unit may be employed in a system of a plurality of hardware units in network communication with each other that are each capable of carrying out at least one mechanical function and that each include a respective floating master controller. The floating master controller may include a processor configured via executable instructions included in a memory to cause the hardware unit to operate in one of at least four modes in which the hardware unit is configured to operate, including a master mode, a backup mode, a tracking mode, and a fault mode.

When the hardware unit is operating in the master mode, the hardware unit is configured to send control data to the other hardware units in the system to control the at least one mechanical function in each of the other hardware units. Also, when the hardware unit is operating in the backup mode the hardware unit is configured to: track one of the other hardware units in the system that is operating in the master mode, and thereby operate the at least one mechanical function of the hardware unit responsive to control data received from the other hardware unit that is operating in the master mode; cause the hardware unit operating in the backup mode to begin operating in the master mode, responsive to the other hardware unit operating in the master mode entering the fault mode; and cause the hardware unit to begin operating again in the backup mode and tracking the other hardware unit, responsive to the other hardware unit operating again in the master mode.

Further, when the hardware unit is operating in the tracking mode: the hardware unit is configured to: track one of the other hardware units in the system operating in the master mode and thereby operate the at least one mechanical function of the hardware unit responsive to the control data received from the other hardware unit that is operating in the master mode; not cause the hardware unit operating in the tracking mode to begin operating in the master mode, responsive to the other hardware unit operating in the master mode entering the fault mode; and cause the hardware unit to begin tracking the other hardware unit or a further hardware unit in the system, responsive to the other hardware unit operating again in the master mode or responsive to the further hardware unit operating in the master mode. In addition, when the hardware unit detects an internal fault condition, the hardware unit is configured to begin operating in the fault mode.

In another example, a method for operating a floating master controller may comprise acts carried out through operation of at least one processor that correspond to the functions for which the previously described system is configured to carry out.

A further example may include a non-transitory computer readable medium encoded with executable instructions (such as a software component on a storage device) that when executed, causes at least one processor to carry out this described method.

Another example may include a product or apparatus including at least one hardware unit, software, and/or firmware-based processor, computer, component, controller, means, module, and/or unit configured for carrying out functionality corresponding to this described method.

The foregoing has outlined rather broadly the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the Detailed Description below, it should be understood that various definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Various technologies that pertain to systems and methods that facilitate controlling multiple similar mechanical devices in a system will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Figure 1:
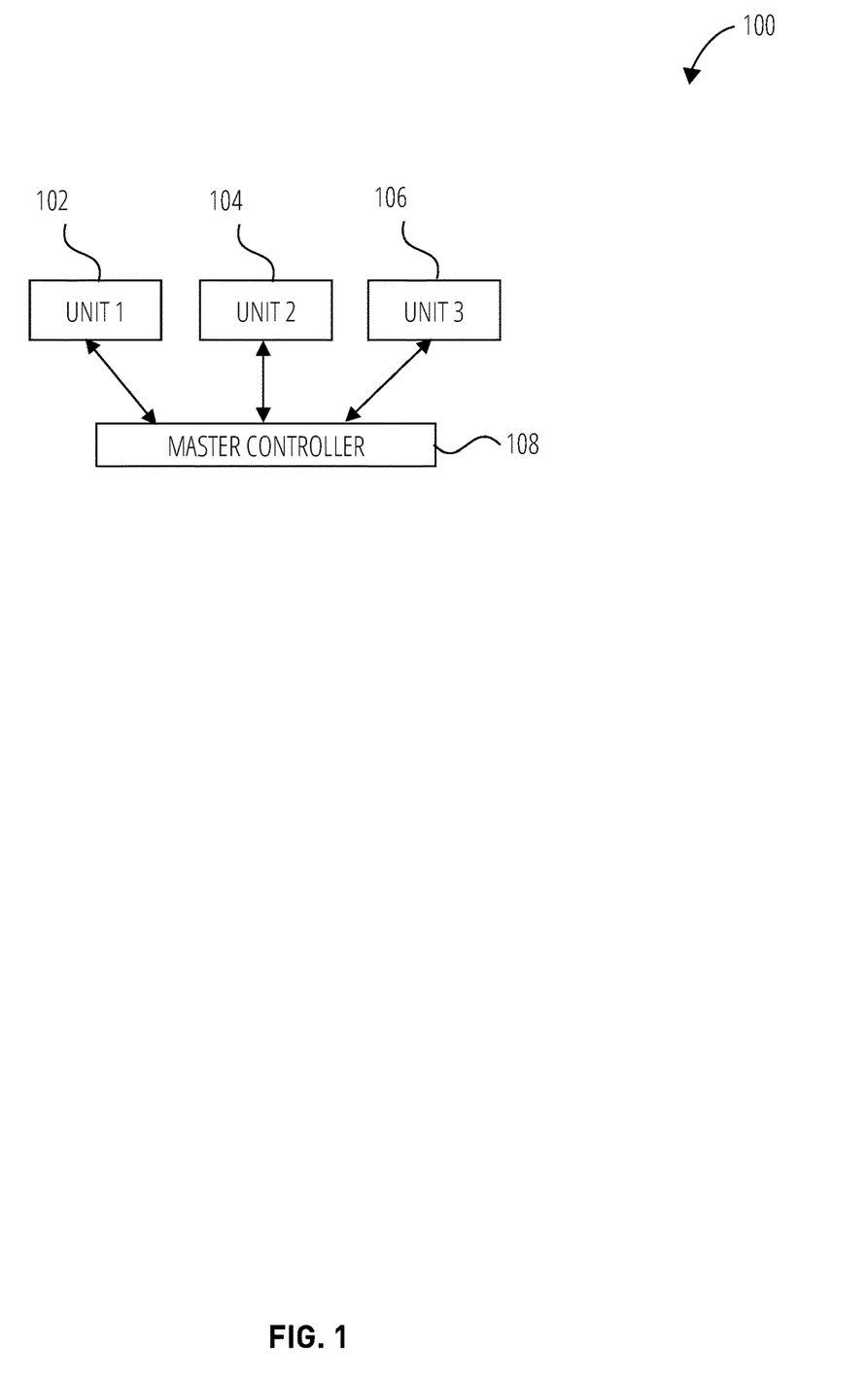
FIG. 1 illustrates a functional block diagram of an example system of hardware units, being controlled by an external master controller.

With reference to FIG. 1, an example system 100 is described that includes several hardware units 102, 104, 106 that carry out mechanical functions. The system 100 may also employ a master controller 108 that controls the operation of each of the units 102, 104, 106. Examples of such hardware units may include compressors, pumps, motors, or any other set of machines that can track a master controller and operate responsive thereto. A mechanical function, for example, may include a compressor compressing a gas, a pump pumping a fluid, or a motor turning a shaft. In an example involving compressors, such a master controller may carry out flow control of three or more compressors to maintain an overall plant throughput. The master controller 108 determines the action required by each hardware unit and transmits the appropriate control commands to each of them. The master controller may be located separately from the hardware units being controlled, increasing cost, space requirements and complexity. If the master controller fails or a connection to the hardware units fail, the individual units may be unable to operate in isolation and revert to a failed or other default state (in which the system stops operating completely or operates in an undesirable degraded mode).

Figure 2:
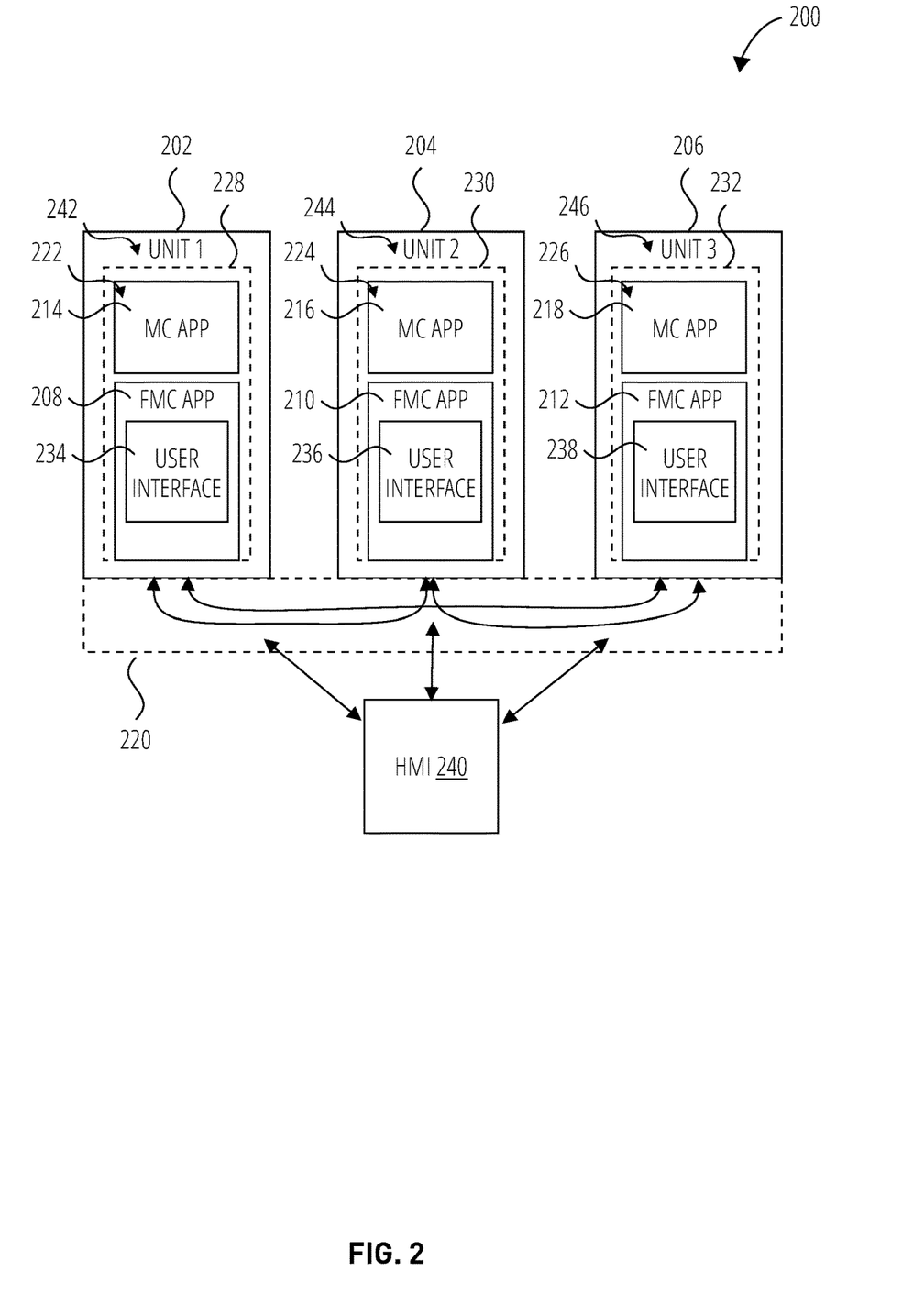
FIG. 2 illustrates a functional block diagram of an example system of hardware units, each having a separate floating master controller.

With reference to FIG. 2, an improved example system 200 is described that includes several spaced-part hardware units 202, 204, 206 that carry out mechanical functions (such as would be carried out by the units 102, 104, 106 described in FIG. 1). Again, examples of such units may include compressors, pumps, motors, or any other set of mechanical or electrical machines that operate and/or are controlled by a common master controller. However, in contrast to the system 100 depicted in FIG. 1, each hardware unit 202, 204, 206 in system 200 includes a floating master controller 242, 244, 246, which is operably configured to carry out the functionality of an active master controller when needed.

Each floating master controller may be implemented via controller code 222, 224, 226 (i.e., processor/computer executable instructions) configured to be executed by respective general purpose or special purpose processors 228, 230, 232 included with each respective hardware unit. In an example, such controller code may include different software/firmware applications (i.e., programs, services) that execute and carry out the functions described herein for the controller code. Such controller code may include a master controller (MC) application 214, 216, 218. Such controller code may also include a floating master controller (FMC) application 208, 210, 212. It should also be appreciated that each of the MC application and the FMC application may themselves be comprised of one or more applications (i.e., programs, services).

In an example embodiment, the portions of the controller code referred to as the MC application 214, 216, 218 are configured to have the necessary code to control its associated hardware unit and one or more other hardware units, and be controlled responsive to controller code in another hardware unit in the system. The portions of the controller code referred to as the FMC application 208, 210, 212, are configured to 'float' an active (i.e., currently in control of itself and other hardware units) master controller between the hardware units; and to facilitate data synchronization, fault detection between the hardware units.

Thus, each MC application is operably configured to function as an active master controller that controls the mechanical function(s) in each of the plurality of hardware units in the system (i.e., the other hardware units and itself). Also, each MC application is operably configured to control the at least one mechanical function for its respective hardware unit responsive to tracking another one of the MC applications that is functioning as the active master controller in the system. In addition, the FMC application for each hardware unit is operably configured to automatically coordinate with each other FMC application to move active master controller functionality for the system between each of the different MC applications in the system as needed. This described controller code implementation may reduce the cost of hardware (e.g., eliminate a need for a separate master controller mounted to a field panel) and provides redundancy to the system in case of failure of a single hardware unit.

In addition, it should be noted that communications for achieving such functionality between hardware units may be carried out over a wired or wireless network 220. Further it should be appreciated that communications between the different portions of the controller code (i.e., the MC application and FMC application) may be carried out via function calls, network communications, or another other form of communication capable of being carried out by a processor responsive to software and/or firmware. Also, it should be appreciated that the hardware processor 228, 230, 232 for each hardware unit maybe capable of executing other applications and other types of controllers and/or hardware functions of the hardware unit.

In addition, it should be appreciated that in alternative embodiments of the described controller code, the functions described as being carried out by the MC application and the FMC application may be programmed into a single software/firmware application that executes and carries out these functions, or alternatively may be programmed into more than two software/firmware applications that execute and carry out these functions. In addition, each hardware unit may include one or more physical general purpose or dedicated hardware processors 228 that is/are capable of executing applications or functions corresponding to the described controller code (as well as other applications, programs, services, functions, and code). Thus, the described controller code, may correspond to one or more software and/or firmware applications that can be executed by one or more hardware processors included in a floating master controller of a hardware unit.

As illustrated in FIG. 2, a hardware unit 202 may include one MC application 214, and one corresponding FMC application 208. However, as will be described in more detail with respect to FIG. 3, it should be appreciated that a hardware unit may include more than one FMC application, which are each configured to track a different input or carry out other different functions (e.g., one FMC application for each function or type of function that is desirable to be monitored and/or controlled by a master controller). These FMC applications can be distributed across several hardware units which carry out similar functions. However, it should also be appreciated that some of such MC and FMC applications may be applicable to different types of hardware units that do not carry out the same set of functions. Also, although the examples described herein illustrate a system with three different hardware units, it should be appreciated that alternative embodiments may include two, three, four, or more hardware units that are capable of operating using the described arrangement of FMC and MC applications.

In example embodiments, each combination of an FMC application and a MC application may be operable (when operating in a suitable processor associated with a hardware unit) to provide redundancy of control across multiple units. Thus, two or more hardware units may be configured such that each is capable of taking over the operation of acting as the active master controller unit for itself and other units. For example, when units detect that one active master controller unit is unable to continue serving as the active master controller, the other hardware units may be configured to decide on which of the remaining units will take over the operation of the active master controller for the system (via communications over the network 220). Further, in any given system, one or more hardware units may be configured so as to not take over the role of a master controller. Such units may be configured to only track whichever unit is currently operating as the active master controller, but are also configured to not automatically takeover and become the active master controller role themselves.

To carry out this described functionality, each FMC application 208, 210, 212 may be operably configured to carry out synchronization of data over the network 220 between the units, including operator selections from a human machine interface (HMI) 240 and data associated with each MC application and each FMC application. Such an HMI 240 may include an input device and an output device (such as a display), such as those described in more detail with respect to FIG. 8. The controller code and/or the FMC application itself may include a user interface portion 234, 236, 238 that communicates information to and from the HMI 240 connected to a hardware unit locally or connected via the network 220.

Each FMC application may be operably configured to detect faults associated with the communications (and/or lack thereof) from an active master controller unit, and carry out a fallback strategy. Such a fallback strategy may include attempting to move the active master controller functionality to another unit via a bumpless transfer (i.e., without disrupting the operation of the units). Such a fallback strategy may also include an FMC application placing its respective unit in a particular operating mode which corresponds to the preferred operation of the unit when the active master controller fails to operate as expected. Also, as will be described in more detail with respect to FIG. 5, the FMC application (via a user interface portion) may cause the HMI to display the current operating mode and fault indications for the hardware units in the system. Such information may be collected by each FMC application through communication with other FMC applications operating in other hardware units. Also, in example embodiments, the FMC application in any one of the hardware units in the system, may be operably configured (e.g., responsive to selection inputs through the HMI) to switch the active master controller functionality for the system to any one of the MC applications through communication with the FMC applications in each of the hardware units.

As discuss previously, a hardware unit may include more than one FMC application. Such an arrangement facilitates synchronization of data from different controller functions throughout the system. For example, with reference to FIG. 3, an alternative example system 300 is described that includes a hardware unit 302 and several similarly configured hardware units 304. Each hardware unit (such as illustrated for hardware unit 302) may be configured with an MC application 306 and optional other types of controllers such as proportional-integral-derivative (PID) controllers 308, 310. Respective FMC applications 312, 314, 316 may be included with each unit to handle the data transfer for these different types of functions and/or controllers in the hardware unit (i.e., MC application 306, PID controller 308, and PID controller 310). It should be appreciated that a unit may include as many FMC applications as needed to facilitate operation of the unit. If multiple FMC applications are configured in each hardware unit, they may be configured to synchronize with each other so that all of the FMC applications in the same hardware unit are in the same operating mode for the hardware unit at the same time.

Figure 3:
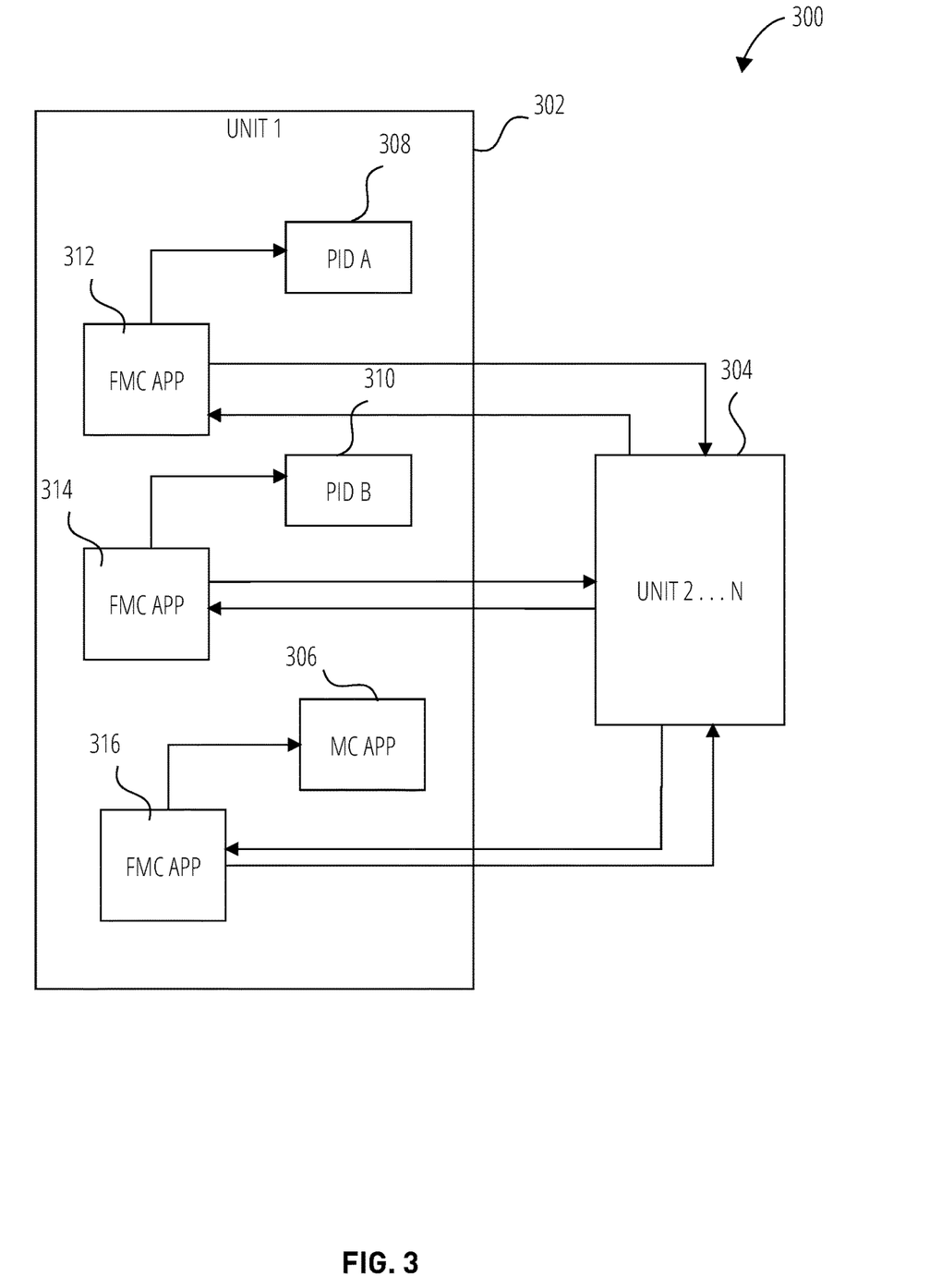
FIG. 3 illustrates a functional block diagram of an example system of hardware units, each having multiple floating master controller applications.

For example, the FMC applications and the MC application in a hardware unit may configured to be in operating modes, such as: a master mode; a backup mode; a tracking mode; and a fault mode. In the master mode, the FMC applications and MC application cause their hardware unit to operate as the active master controller for the system of units. The FMC applications and MC application in each of the other hardware units in the system will typically be in a tracking mode, which tracks (operates responsive to) the control data communications from the active master controller unit. In example embodiments, tracking modes may include the backup mode; the tracking mode, and the fault mode.

In the backup mode, the unit is configured to track the active master controller unit, but also are configured to cause the unit to become the active master controller (i.e., switching to the master mode and cease tracking), when the unit is unable to communicate with the current active master controller unit (e.g., fails to detect an expected heart beat communication) or the current active master controller unit develops a fault and communicates that it is now in a fault mode. When multiple hardware units are in the backup mode and detect a lack of communication or a fault with the current active master controller unit, such hardware units will determine which of them switches to the master mode and becomes the new active master controller unit.

When a hardware unit detects a fault that prevents the unit from becoming or remaining as an active master controller, it places itself in the fault mode and communicates its fault status to other units. A former master controller unit, that switches to a fault mode, may also start tracking the new active master controller unit, or may not track another unit and instead take other actions according to it configuration.

In the tracking mode, the hardware unit is also configured to track the active master controller unit. However, unlike with the backup mode, the hardware unit in the tracking mode will not automatically become the active master controller when it is unable to communicate with the current active master controller or the current active master controller develops a fault (and changes to a fault mode).

As discussed previously, the FMC application associated with a hardware unit may be operably configured to receive from an HMI a selection of which of the units in the system should be set as the active master controller unit. This is useful when the unit currently active as the master controller is going to have maintenance or will be disabled/turned off. The initial FMC application receiving the selection, will communicate this selection to the FMC applications of the other hardware units, and the system will configure itself accordingly. However, a hardware unit that is in the tracking/inland mode or in a fault mode (e.g., that has received a field fault or a communication fault) may not be selectable via an HMI to become the active master controller (by switching to the master mode) until it is no longer in the tracking mode and/or is no longer in the fault mode (e.g., unit fault(s) has been cleared/corrected).

Figure 4:
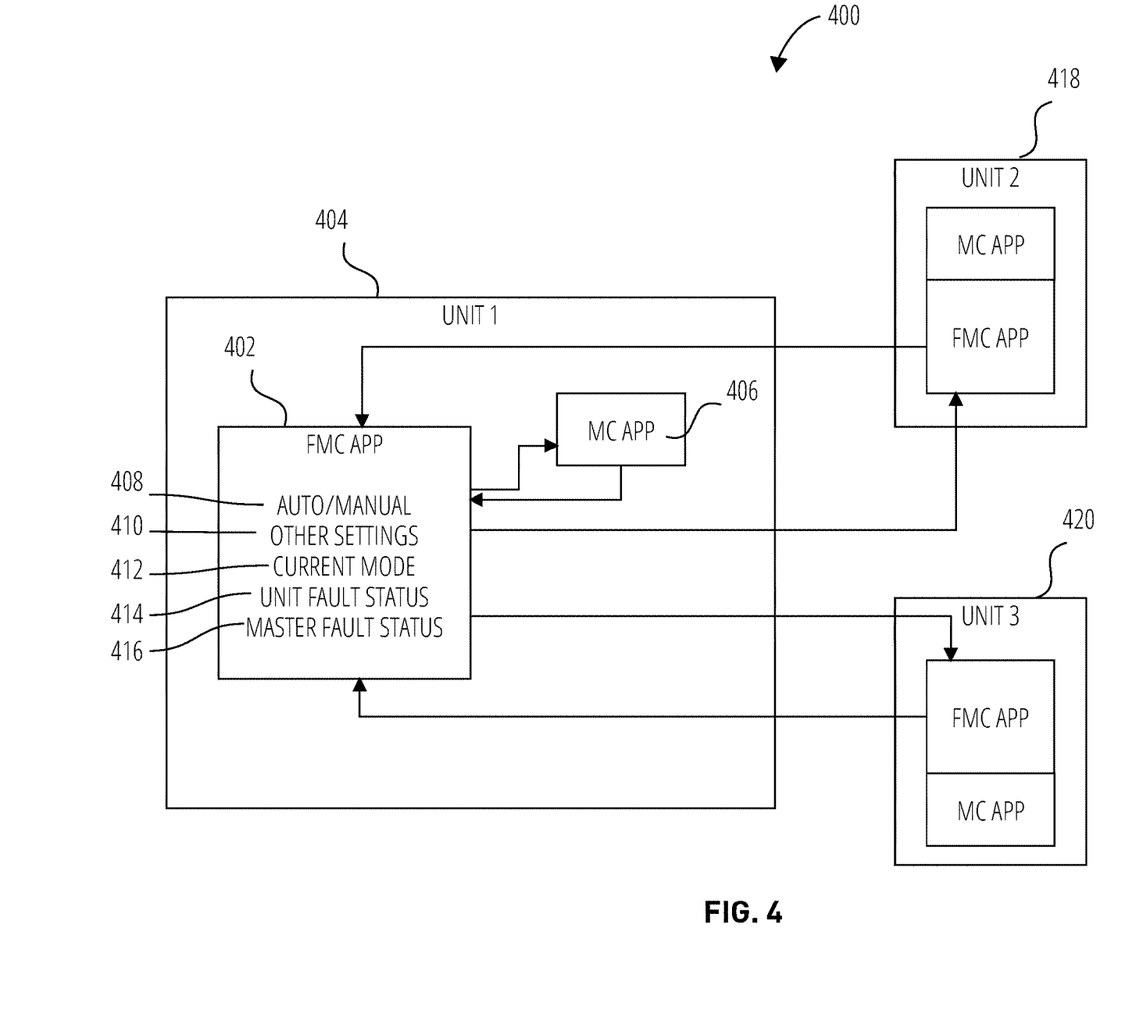
FIG. 4 illustrates a functional block diagram of an example system of hardware units, which carry out floating master controller data synchronization.

FIG. 4, illustrates an example system 400 in which hardware units may be configured to carry out and synchronize communications of data between FMC applications, MC applications, and HMIs in units in order to enable these described modes of operation. For example, an FMC application 402 of a hardware unit 404 may receive communications in the form of control data, configuration settings and/or fault data from its hardware unit 404 and/or from another hardware unit 418, 420 (e.g., via communications between the FMC applications). The MC applications may operate responsive to this data collected by its FMC application to carry out operating its hardware unit.

In an example embodiment, a hardware unit may be configurable through an HMI with certain configuration or operator settings. These settings may include: an auto/manual configuration setting 408, and other settings 410 that impact the operation of the MC application such as setpoints and tuning parameters. Also in example embodiments, an FMC application may be operably configured to collect and store in a memory, the current operating mode 412 of the hardware units in the system and communicate this via its user interface portion for display through an HMI. In addition, the FMC application may be operably configured to collect and store in a memory fault data from the MC application or other controllers and communicate such fault data to an HMI. Examples of such fault data may include a unit fault status 414 and a master fault status 416 (indicating whether the hardware unit has a fault and optionally a type of fault).

In example embodiments, the FMC application handles data synchronization between the different FMC applications executing in the other hardware units in the system to ensure that all hardware units are operating with the same data. Each FMC application may send and receive synchronization data from the other FMC application using existing communication networks. Such synchronization data may include heartbeat signal enabling the receiving unit to determine communications health. Such synchronization data may also include the current operating mode of its hardware unit (e.g., master, backup, tracking, fault modes). Further, such synchronization data may include MC application values to ensure the MC application state in each unit remains synchronized. In addition, such synchronization data may include operator settings provided via an HMI (e.g., auto/manual configuration setting, setpoints and tuning parameters). If the operator changes these values at the active master controller unit, the values will be transferred to the other hardware units automatically via the data synchronization carried out by the FMC applications. The MC application acting in the master mode in the active master controller unit, feeds updated data to the FMC application to be forwarded to the other hardware units. The MC application in the tracking units (the hardware units that are in a tracking mode) is synchronized to the data received from the active master controller unit.

Figure 5:
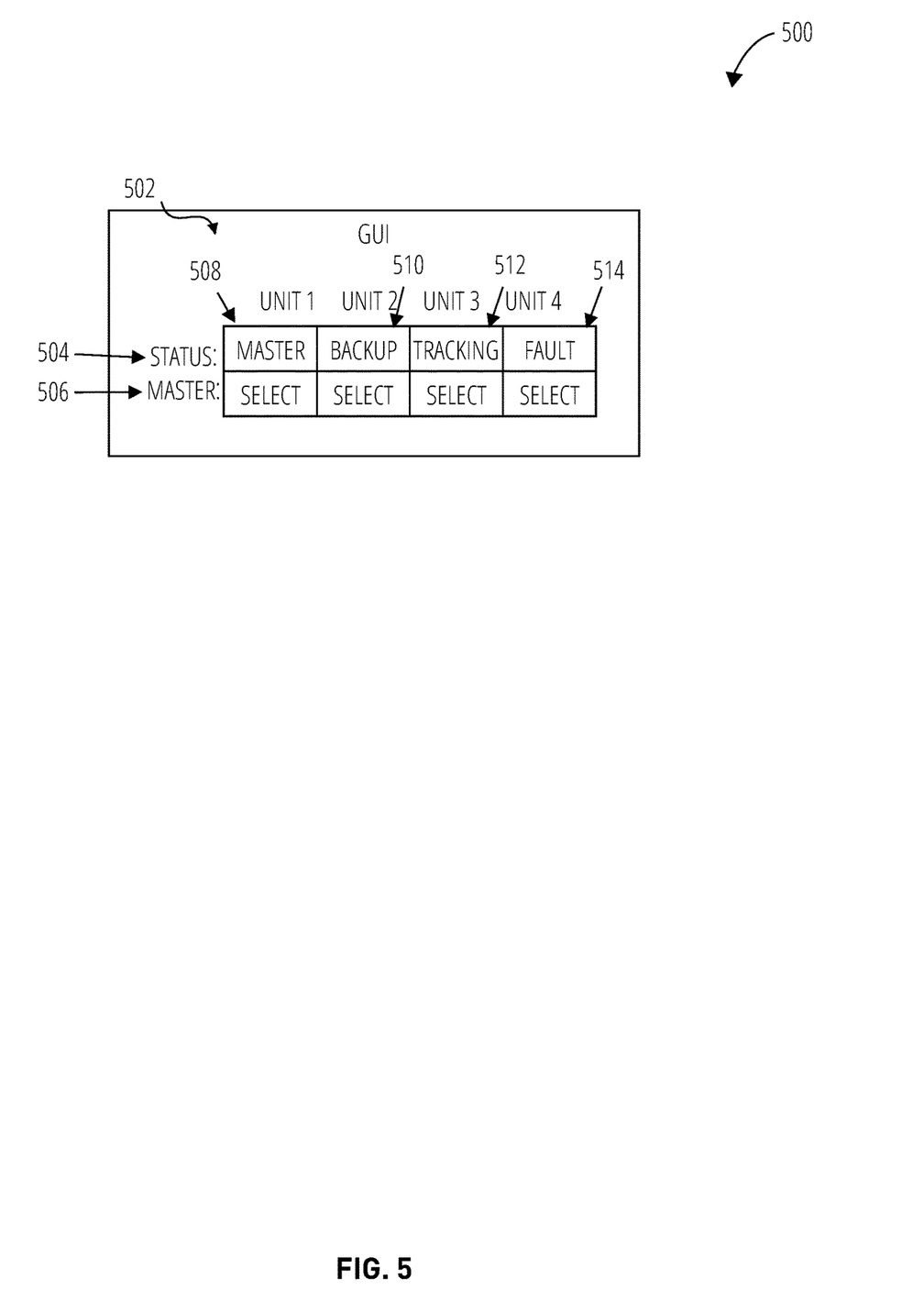
FIG. 5 illustrates an example graphical user interface outputting the operating mode statuses of the hardware units in the system, and enabling an operator to select which hardware unit is to operate as the active master controller unit for the system.

FIG. 5 illustrates an example user interface output 500 outputting the status of hardware units in a system. Such a user interface output 500 may correspond to graphical user interface (GUI) 502 shown via an HMI. The graphical user interface may be generated by the user interface portion 234 of an FMC application based on information collected by the FMC application from its MC application and/or other FMC applications. However, it should also be appreciated that another application or portion of the controller code in a hardware unit may include the described user interface portion and be capable of generating the user interface output 500.

In example embodiments, the GUI 502 displays information that enables the operator to understand the statuses of the hardware units and be able to control the operation of its hardware units via communication with the FMC application as required. In this example, the GUI outputs the statuses 504 of all controller units (e.g., units 1 to 4), such as their current operating mode (e.g., master, backup, tracking, fault or disabled). In addition, in this example the GUI outputs selection user interface elements 506 (e.g., buttons, toggles, switches) that enable a user (via selection inputs from an HMI) to select which unit is to be the active master controller unit, (if not in a fault mode or tracking mode). Such a GUI 502 may be available to be displayed at each unit that has an enabled FMC application.

In an example embodiment, FMC applications in a hardware unit may also be configured to receive configuration settings from the HMI via other GUI screens (not shown). Such configuration settings may include a unit number (1 through 4) for this unit and the total number of units within the system (2 through 4) that also have FMC applications.

On startup of a hardware unit, the FMC application may be configured to initiate a time delay to allow the unit to complete start up and establish communications to any existing hardware units. Upon expiration of the time delay, if an active master control unit in the system has not been detected, and the hardware unit has not been configured to be in the tracking mode, then the FMC application will have its unit become the active master control unit (in the master mode). When an FMC application for a hardware unit is configured to be in the master mode, the hardware unit may be referred to as a master unit with a MASTER status 508 displayed through the GUI 502 for the unit.

If an active master control unit in the system is detected, the FMC application will have its hardware unit enter a tracking mode, and track the active master unit (such as in the backup mode or tracking mode). In example embodiments, if a hardware unit is tracking the active master controller, but is not configured to be in the tracking mode, it may be referred to as a backup unit with a BACKUP status 510 displayed through the GUI 502 for the hardware unit. Such a hardware unit will be in the backup mode, and will take over being the active master controller unit when needed, as discussed previously.

When an FMC application for a hardware unit is configured to be in the tracking mode, the hardware unit may be referred to as a tracking unit with a TRACKING status 512 displayed through the GUI 502 for the hardware unit. Such a tracking unit will track the active master controller unit, or the unit with the lowest assigned unit number available if there is no active master controller unit. However, as discussed previously, such a tracking unit will not become the active master controller unit for the system, if an active master controller unit is not available. Rather the MC application for the tracking unit will hold its current state until an active master controller unit is detected again.

In example embodiments, a loss of process variable at one of the process controllers that are part of a unit may result in the hardware unit entering the fault mode and may be referred to as a faulted unit with a FAULT status 514 displayed through the GUI 502. If the hardware unit was the active master control unit it will no longer continue acting as the active master control unit. A controller in the backup mode, will then take over as the active master controller unit until the fault in the prior active master control unit is fixed and reset. At that time the hardware unit that dropped out as the active master controller unit (and was previously selected as the active master controller by the operator) may automatically become the active master controller unit again. In additional, as a fallback strategy if multiple backup units are available to become the active master control unit, the MC application with the lowest configured numbered hardware unit may be the default to take over as the active master controller unit.

This described scheme of deploying FMC applications on hardware units, enables the hardware controlling code (including the described MC application or other controller unit function that has the ability to track an input), to be implemented in a distributed architecture with automatic synchronization, a fallback strategy, operator control, and feedback with minimal architecture changes.

Figure 6:
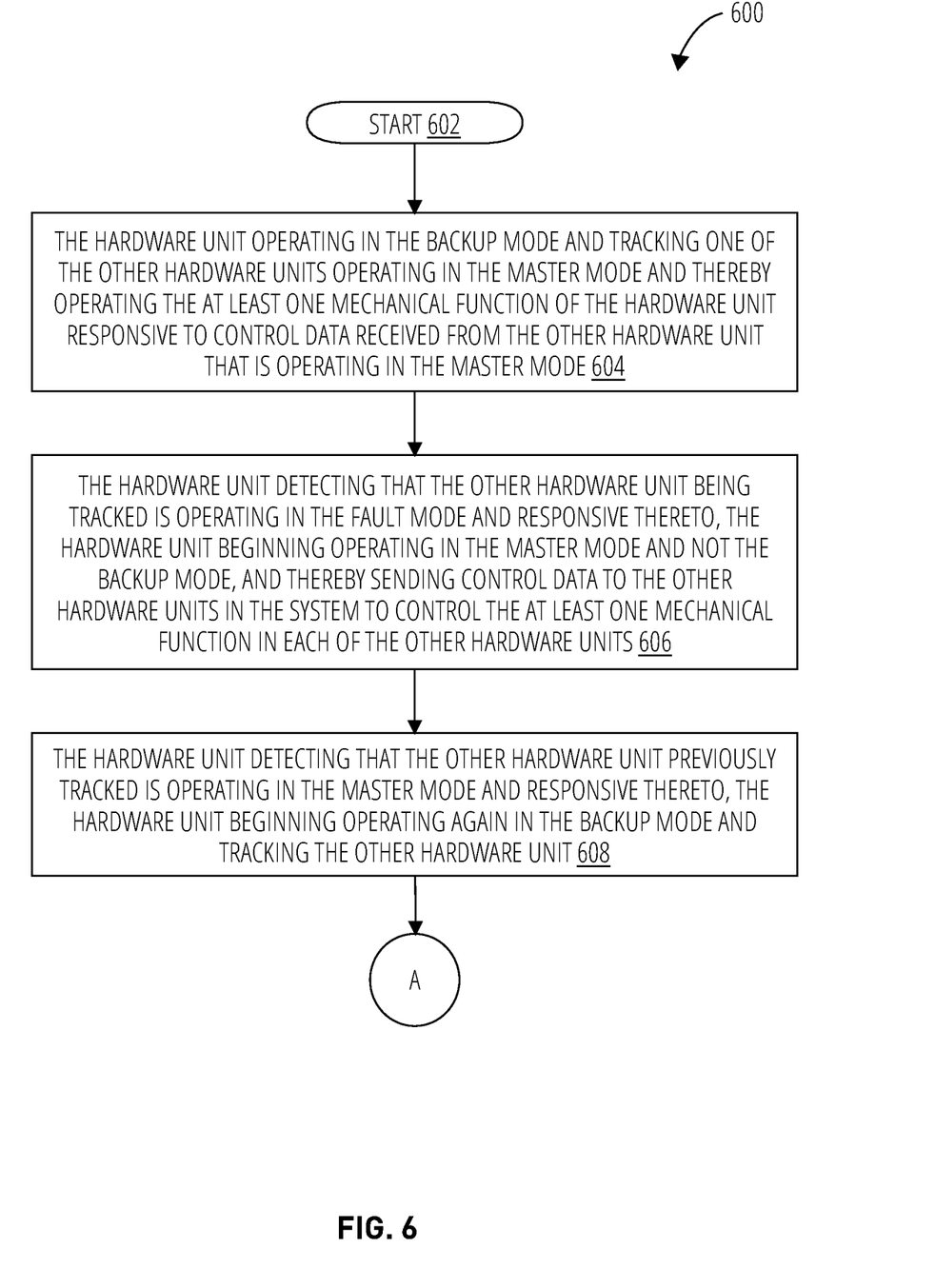
FIG. 6 illustrates a methodology 600 in accordance with one embodiment.
Figure 7:
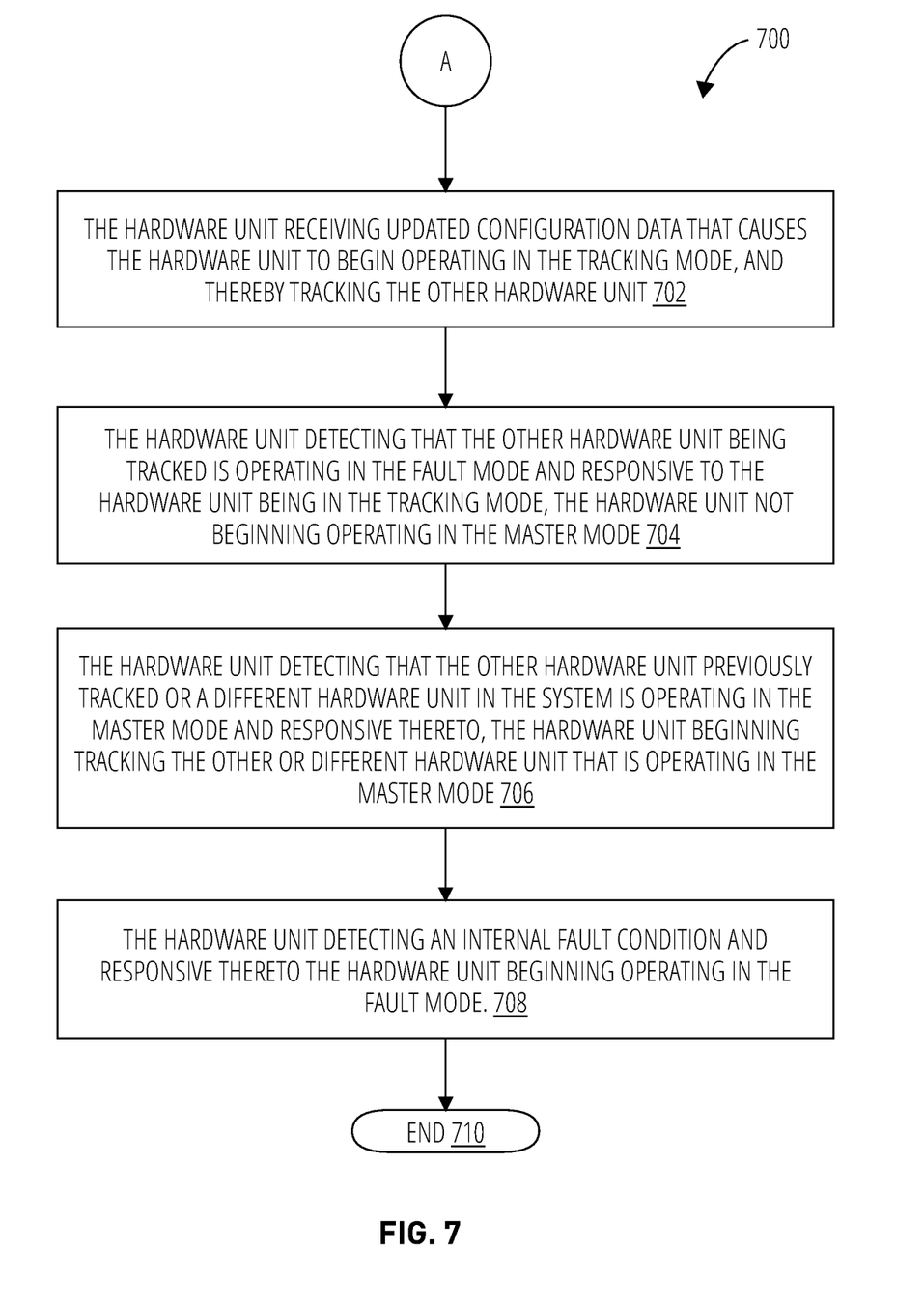
FIG. 7 illustrates a methodology 700 in accordance with one embodiment.

Referring now to FIG. 6 and FIG. 7, a methodology 600, 700 is illustrated that facilitates implementing floating master controllers in a system of hardware units. While the methodology is described as being a series of acts that are performed in a sequence, it is to be understood that the methodology may not be limited by the order of the sequence. For instance, unless stated otherwise, some acts may occur in a different order than what is described herein. In addition, in some cases, an act may occur concurrently with another act. Furthermore, in some instances, not all acts may be required to implement a methodology described herein.

Referring to FIG. 6, the methodology 600 may start at 602 and may include several acts carried out through operation of a processor of a hardware unit in a system of a plurality of hardware units in network communication with each other that are each capable of carrying out at least one mechanical function and that each include a respective floating master controller. The floating master controller may be configured to operate in one of at least four modes in which the hardware unit is configured to operate, including a master mode, a backup mode, a tracking mode, and a fault mode. This described methodology may include an act 604 in which the hardware unit operates in the backup mode and tracks one of the other hardware units operating in the master mode and thereby operates the at least one mechanical function of the hardware unit responsive to control data received from the other hardware unit that is operating in the master mode. In act 606, the hardware unit detects that the other hardware unit being tracked is operating in the fault mode and responsive thereto, the hardware unit begins operating in the master mode and not the backup mode, and thereby sends control data to the other hardware units in the system to control the at least one mechanical function in each of the other hardware units. In act 608, the hardware unit detects that the other hardware unit previously tracked is operating in the master mode and responsive thereto, the hardware unit begins operating again in the backup mode and tracking the other hardware unit.

Referring to FIG. 7, additional acts 700 of the methodology 600 may include an act 702, in which the hardware unit receives updated configuration data that causes the hardware unit to begin operating in the tracking mode, and thereby tracks the other hardware unit. In act 704, the hardware unit detects that the other hardware unit being tracked is operating in the fault mode and responsive to the hardware unit being in the tracking mode, the hardware unit does not begin operating in the master mode. In act 706 the hardware unit detects that the other hardware unit previously tracked or a different hardware unit in the system is operating in the master mode and responsive thereto, the hardware unit begins tracking the other or different hardware unit that is operating in the master mode. In act 708 the hardware unit detects an internal fault condition and responsive thereto the hardware unit begins operating in the fault mode. At 710 the described methodology 600, 700 may end.

It should be appreciated that this described methodology may include additional acts and/or alternative acts corresponding to the features described previously with respect to a floating master controller.

For example, the methodology may include an FMC application storing configuration settings in a memory regarding the configuration of the hardware unit and the system, and communicating control data between itself and further FMC applications executing in respective processors for each of the other hardware units in the system. Also, the methodology may include the MC application controlling the at least one mechanical function of the hardware unit responsive to the configuration settings and the control data received from the FMC application.

In these examples, the FMC application and the MC application may be configured to cause the hardware unit to operate in one of the at least four modes, including the master mode, the backup mode, the tracking mode, and the fault mode. When the hardware unit is operating in the master mode, the MC application is configured to send control data to the FMC application, which communicates the control data to the further FMC applications to control the at least one mechanical function in each of the other hardware units in the system.

When the hardware unit is operating in the backup mode: the MC application is configured to track one of the other hardware units in the system operating in the master mode and operate the at least one mechanical function of the hardware unit responsive to the control data received by the FMC application from one of the further FMC applications of one of the other hardware units that is operating in the master mode; and the FMC application and the MC application are configured to cause the hardware unit operating in the backup mode to begin operating in the master mode, responsive to the other hardware unit operating in the master mode entering the fault mode.

When the hardware unit is operating in the tracking mode, the MC application is configured to track one of the other hardware units in the system operating in the master mode and operate the at least one mechanical function of the hardware unit responsive to the control data received by the FMC application from one of the further FMC applications of one of the other hardware units that is operating in the master mode.

In example embodiments of this described methodology, the FMC application may provide data that enables a human machine interface (HMI) to display a graphical user interface that depicts the current operating mode for each of the hardware units in the system.

The methodology may include the FMC application and/or a user interface application providing data that enables the HMI to depict at least one selection user interface element that enables an operator to provide an input to the HMI that selects which of the hardware units is to be the active master controller unit. The methodology may also include the FMC application receiving data via the HMI indicative of the hardware unit in the system being selected as the active master controller unit, and responsive thereto the FMC application causing the operating mode for the hardware device to change to the master mode and communicating the change in operating mode to the FMC applications in the other hardware units. In example embodiments, when a hardware unit begins operating in the fault mode, the FMC application may communicate to the FMC applications in the other hardware units that it is operating in the fault mode.

Also, the methodology may comprise the FMC application receiving updated data via the HMI indicative of a second hardware unit in the system being selected as the active master controller, and responsive thereto the FMC application communicating the selection of the second hardware unit being selected as the active master controller to an FMC application of the second hardware unit, whereby the hardware unit begins operating in the backup mode and the further hardware unit begins operating in the master mode.

Also in example embodiments, the FMC application may correspond to a first FMC application. The hardware unit may include a PID controller. The methodology may further comprise a second FMC application controlling the PID controller to operate responsive to control signals received by the second FMC application from a third FMC application that is operating in the master mode.

In addition, in these described embodiments of the methodology, the hardware unit may include a compressor and the at least one mechanical function may include compressing a gas.

It is also important to note that while the disclosure includes a description in the context of a fully functional system and/or a series of acts, those skilled in the art will appreciate that at least portions of the mechanism of the present disclosure and/or described acts may be capable of being distributed in the form of computer/processor executable instructions (e.g., software/firmware applications) contained within a storage device that corresponds to a non-transitory machine-usable, computer-usable, or computer-readable medium in any of a variety of forms (e.g., flash memory, SSD, hard drive). The computer/processor executable instructions may include a routine, a sub-routine, programs, applications, modules, libraries, and/or the like. Further, it should be appreciated that computer/processor executable instructions may correspond to and/or may be generated from source code, byte code, runtime code, machine code, assembly, Java, JavaScript, Python, Rust, Swift, Go, C, C #, C++ or any other form of code that can be programmed/configured to cause at least one processor to carry out the acts and features described herein. Still further, results of the described/claimed processes or functions may be stored in a computer-readable medium, displayed on a display device, and/or the like.

It should be appreciated that acts associated with the above-described methodologies, features, and functions (other than any described manual acts) may be carried out by one or more data processing systems via operation of one or more of the processors. Thus, it is to be understood that when referring to a data processing system, such a system may be implemented across several data processing systems organized in a distributed system in communication with each other directly or via a network.

As used herein a processor corresponds to any electronic device that is configured via hardware circuits, software, and/or firmware to process data. For example, processors described herein may correspond to one or more (or a combination) of a microprocessor, CPU, or any other integrated circuit (IC) or other type of circuit that is capable of processing data in a data processing system. As discuss previously, the processor that is described or claimed as being configured to carry out a particular described/claimed process or function may correspond to a CPU that executes computer/processor executable instructions stored in a memory in the form of software to carry out such a described/claimed process or function. However, it should also be appreciated that such a processor may correspond to an IC that is hardwired with processing circuitry (e.g., an FPGA or ASIC IC) to carry out such a described/claimed process or function. Also, it should be understood, that reference to a processor may include multiple physical processors or cores that are configured to carry out the functions described herein. In addition, it should be appreciated that a data processing system and/or a processor may correspond to a controller that is operably configured to control at least one operation including a programmable logic controller (PLC).

In addition, it should also be understood that a processor that is described or claimed as being configured to carry out a particular described/claimed process or function may correspond to the combination of the processor with the executable instructions (e.g., software/firmware applications) loaded/installed into the described memory (volatile and/or non-volatile), which are currently being executed and/or are available to be executed by the processor to cause the processor to carry out the described/claimed process or function. Thus, a processor that is powered off or is executing other software, but has the described software loaded/stored in a storage device in operative connection therewith (such as in a flash memory, SSD, or hard drive) in a manner that is available to be executed by the processor (when started by a user, hardware and/or other software), may also correspond to the described/claimed processor that is operably configured to carry out the particular processes and functions described/claimed herein.

Figure 8:
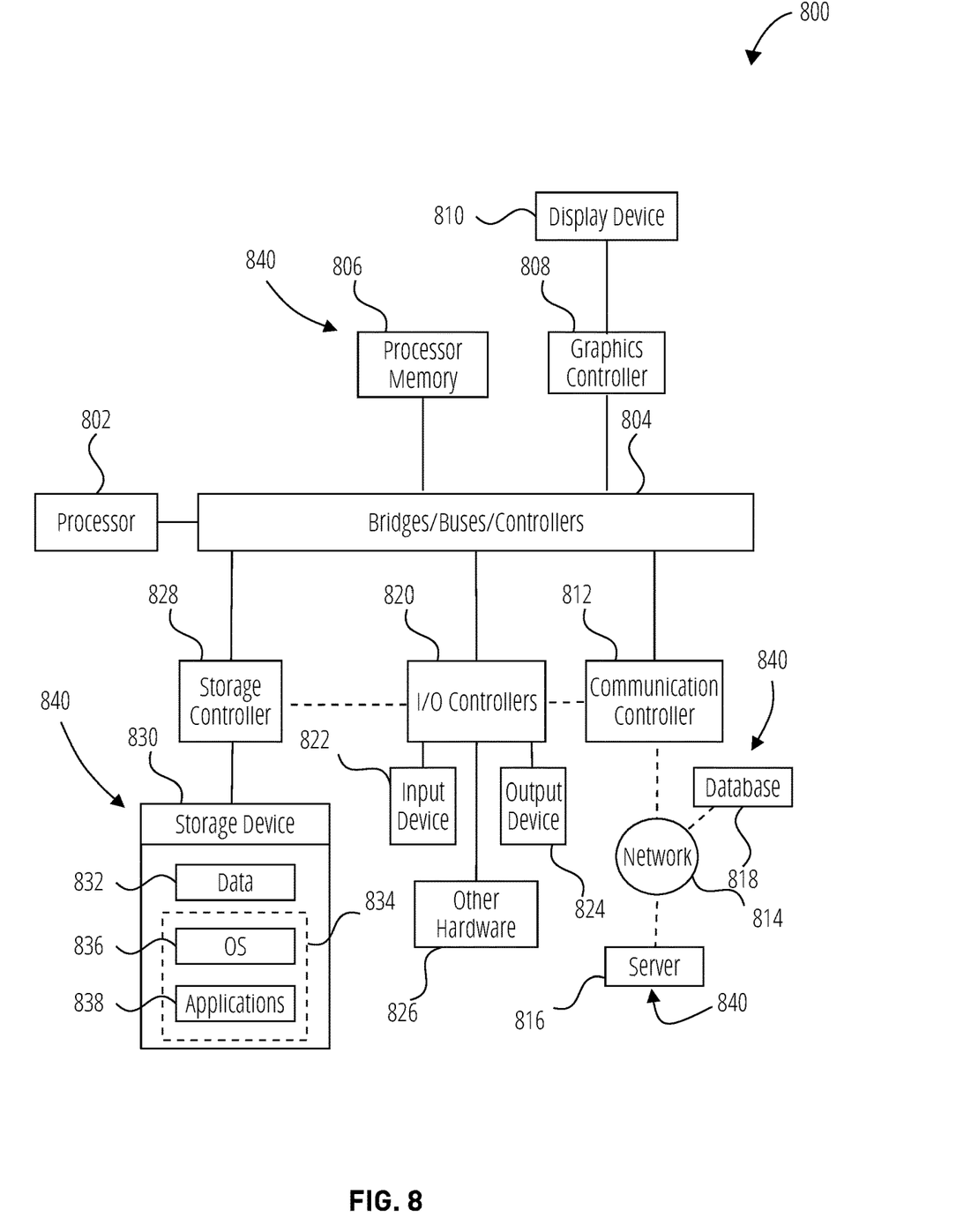
FIG. 8 illustrates a block diagram of a data processing system 800 in which an embodiment may be implemented.

FIG. 8 illustrates a block diagram of an example data processing system 800 with which one or more embodiments of the floating master controller and/or other data processing system described herein may be implemented. For example, in some embodiments, at least one processor 802 (e.g., a CPU) may be connected to one or more bridges/buses/controllers 804 (e.g., a north bridge, a south bridge). One of the buses for example, may include one or more I/O buses such as a PCI Express bus. Also connected to various buses in the depicted example may include the processor memory 806 (e.g., RAM) and a graphics controller 808. The graphics controller 808 may generate a video signal that drives a display device 810 (e.g., LCD, OLED screens). It should also be noted that the processor 802 in the form of a CPU may include a memory therein such as a CPU cache memory. Further, in some embodiments one or more controllers (e.g., graphics, south bridge) may be integrated with the CPU (on the same chip or die). Examples of CPU architectures include IA-32, x86-64, and ARM processor architectures.

Other peripherals connected to one or more buses may include communication controller 812 (Ethernet controllers, WiFi controllers, cellular controllers) operably configured to connect to a network 814 such as a local area network (LAN), Wide Area Network (WAN), the Internet, a cellular network, and/or any other wired or wireless networks or communication equipment. The data processing system 800 may be operably configured to communicate with one or more servers 816, and/or any other type of device or other data processing system, that is connected to the network 814. For example, in some embodiments, the data processing system 800 may be operably configured to communicate with a database. Examples of a database may include a relational database (e.g., MySQL, Oracle Database, Microsoft SQL Server) or a non-relational database (such as a NoSQL database). Also, it should be appreciated that is some embodiments, such a database may be executed by the processor 802.

Further components connected to various busses may include one or more I/O controllers 820 such as USB controllers, Bluetooth controllers, and/or dedicated audio controllers (connected to speakers and/or microphones). It should also be appreciated that various peripherals may be connected to the I/O controller(s) (via various ports and connections) including an input device 822 (e.g., a mouse, pointer, keyboard, touch screen, keypad), and an output device 824 (e.g., printers, speakers) or any other type of device that is operative to provide inputs to and/or outputs to/from the data processing system. Also, for example, an output device 824 may also include or correspond to a display device 810.

It should be appreciated that many devices referred to as input devices or output devices may both provide inputs and receive outputs of communications with the data processing system 800. For example, the processor 802 may be integrated into a housing (such as a tablet) that includes a touch screen that serves as both an input and display device. Further, it should be appreciated that some input devices such as a human machine interface (HMI) may include a plurality of different types of input devices (e.g., touch screen, touch pad, and keyboard) as well as a display device (touch screen or non-touch screen). Also, it should be appreciated that other hardware 826 connected to the I/O controllers 820 may include any type of device, machine, sensor, or component that is configured to communicate with a data processing system, including the communication controller 812 and/or a storage controller 828 (e.g., HBA, SCSI, SATA).

A storage controller connected to one or busses or I/O controllers in the system, may also be connected to a storage device 830 such as one or more non-volatile storage drives and/or any associated removable media. Also, in some examples, a storage device 830 such as an NVMe SSD may be connected directly to a main I/O bus of the system, such as a PCI Express bus.

It should be understood that the data processing system 800 may directly or over the network 814 be connected with one or more other data processing systems such as a server 816 (which may in combination correspond to a larger data processing system). For example, a larger data processing system may correspond to a plurality of smaller data processing systems implemented as part of a distributed system in which processors associated with several smaller data processing systems may be in communication by way of one or more network connections and may collectively perform tasks described as being performed by a single larger data processing system.

A data processing system in accordance with an embodiment of the present disclosure may include data 832 and executable instructions 834 (such as an operating system 836 and applications 838), which enable the processor to carry out the functions described herein. Such programs and information may be stored and accessed from the storage device 830, the database 818, the processor memory 806, and/or another data processing system such as a server 816, all of which may correspond to a type of memory 840 for the system. Thus, it should be appreciated that the processor 802 may be configured to execute, manage, retrieve, generate, use, revise, and/or store executable instructions 834 and/or data 832 and/or other information from any type of memory 840 that is accessible to the system. Further it should be appreciated that a memory 840 may also be referred to herein as a data store.

In example embodiments, the operating system may employ a command line interface (CLI) shell and/or a graphical user interface (GUI) shell. The GUI shell permits multiple display windows to be presented in the graphical user interface simultaneously, with each display window providing an interface to a different application or to a different instance of the same application. A cursor or pointer in the graphical user interface may be manipulated by a user through a pointing device such as a mouse or touch screen. The position of the cursor/pointer may be changed and/or an event, such as clicking a mouse button or touching a touch screen, may be generated to actuate a desired response. Examples of operating systems that may be used in a data processing system may include Microsoft Windows, Linux, UNIX, iOS, macOS, and Android operating systems.

In addition, it should be appreciated that data processing systems may include virtual machines in a virtual machine architecture or cloud environment that execute the executable instructions. For example, the processor and associated components may correspond to the combination of one or more virtual machine processors of a virtual machine operating in one or more physical processors of a physical data processing system 800. Examples of virtual machine architectures include VMware ESCi, Microsoft Hyper-V, Xen, and KVM. Further, the described executable instructions may be bundled as a container that is executable via a containerization environment/platform such Docker and/or Kubernetes.

Also, it should be noted that the processor described herein may correspond to a remote processor located in a data processing system such as a server that is remote from the display and input devices (or HMI) described herein. In such an example, the described display device and input device may be included in a client data processing system (which may have its own processor) that communicates with the server (which includes the remote processor) through a wired or wireless network (which may include the Internet). In some embodiments, such a client data processing system, for example, may execute a remote desktop application or may correspond to a portal device that carries out a remote desktop protocol with the server in order to send inputs from an input device to the server and receive visual information from the server to display through a display device. Examples of such remote desktop protocols include Microsoft's RDP and the RFB protocol. In another example, such a client data processing system may execute a web browser or thin client application. Inputs from the user may be transmitted from the web browser or thin client application to be evaluated on the server, and such a server may provide data, code, and/or images (or series of images) back to the client data processing system to update the user interface being displayed by the web browser or thin client application. Also, in some examples, the remote processor described herein may correspond to a combination of a virtual processor of a virtual machine executing in a physical processor of the server.

Those of ordinary skill in the art will appreciate that the hardware and software depicted for the data processing system may vary for particular implementations. The depicted examples are provided for the purpose of explanation only and is not meant to imply architectural limitations with respect to the present disclosure. Also, those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of the data processing system 800 may conform to any of the various current implementations and practices known in the art.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

Further the phrase "at least one" before an element (e.g., a processor) that is configured to carry out more than one function/process may correspond to one or more elements (e.g., processors) that each carry out the functions/processes and may also correspond to two or more of the elements (e.g., processors) that respectively carry out different ones of the one or more different functions/processes Also, it should be understood that the words or phrases used herein should be construed broadly, unless expressly limited in some examples. For example, the terms "include" and "comprise," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean: that an element is relatively near to but not in contact with a further element; or that the element is in contact with the further portion, unless the context clearly indicates otherwise. Further, the phrase "based on" is intended to mean "based, at least in part, on" unless explicitly stated otherwise.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A floating master controller for a hardware unit in a system of a plurality of hardware units in network communication with each other that are each capable of carrying out at least one mechanical function and that each include a respective floating master controller, comprising:
   a processor configured via executable instructions included in a memory to cause the hardware unit to operate in one of at least four modes in which the hardware unit is configured to operate, including a master mode, a backup mode, a tracking mode, and a fault mode,
   wherein when the hardware unit is operating in the master mode, the hardware unit is configured to send control data to the other hardware units in the system to control the at least one mechanical function in each of the other hardware units,
   wherein when the hardware unit is operating in the backup mode the hardware unit is configured to: track one of the other hardware units in the system that is operating in the master mode, and thereby operate the at least one mechanical function of the hardware unit responsive to control data received from the other hardware unit that is operating in the master mode; cause the hardware unit operating in the backup mode to begin operating in the master mode, responsive to the other hardware unit operating in the master mode entering the fault mode; and cause the hardware unit to begin operating in the backup mode and tracking the other hardware unit, responsive to the other hardware unit operating again in the master mode, wherein when the hardware unit is operating in the tracking mode: the hardware unit is configured to: track one of the other hardware units in the system operating in the master mode and thereby operate the at least one mechanical function of the hardware unit responsive to the control data received from the other hardware unit that is operating in the master mode; cause the hardware unit operating in the tracking mode to remain in the tracking mode, responsive to the other hardware unit operating in the master mode entering the fault mode or is not being available; and cause the hardware unit to begin tracking the other hardware unit or a further hardware unit in the system, responsive to the other hardware unit operating again in the master mode or responsive to the further hardware unit operating in the master mode, and wherein when the hardware unit detects an internal fault condition the hardware unit is configured to begin operating in the fault mode.

2. The floating master controller according to claim 1, wherein the processor is configured to:

execute a floating master controller (FMC) application that is configured to store configuration settings in a memory regarding the configuration of the hardware unit and the system, and that is operably configured to communicate control data between itself and further FMC applications executing in respective processors for each of the other hardware units in the system; and execute a master controller (MC) application that is configured to control the at least one mechanical function of the hardware unit responsive to the configuration settings and the control data received from the FMC application, wherein the FMC application and the MC application are configured to cause the hardware unit to operate in one of the at least four modes, including the master mode, the backup mode, the tracking mode, and the fault mode, wherein when the hardware unit is operating in the master mode, the MC application is configured to send control data to the FMC application, which communicates the control data to the further FMC applications to control the at least one mechanical function in each of the other hardware units in the system, wherein when the hardware unit is operating in the backup mode: the MC application is configured to track one of the other hardware units in the system operating in the master mode and operate the at least one mechanical function of the hardware unit responsive to the control data received by the FMC application from one of the further FMC applications of one of the other hardware units that is operating in the master mode; and the FMC application and the MC application are configured to cause the hardware unit operating in the backup mode to begin operating in the master mode, responsive to the other hardware unit operating in the master mode entering the fault mode, and wherein when the hardware unit is operating in the tracking mode, the MC application is configured to track one of the other hardware units in the system operating in the master mode and operate the at least one mechanical function of the hardware unit responsive to the control data received by the FMC application from one of the further FMC applications of one of the other hardware units that is operating in the master mode.

3. The floating master controller according to claim 2, wherein the FMC application is configured to provide data that enables a human machine interface (HMI) to display a graphical user interface that depicts the current operating mode for each of the hardware units in the system.

4. The floating master controller according to claim 3, wherein the FMC application is configured to provide data that enables the HMI to depict at least one selection user interface element that enables an operator to provide an input to the HMI that selects which of the hardware units is to be the active master controller unit, wherein the FMC application is configured to receive data via the HMI indicative of the hardware unit in the system being selected as the active master controller unit, and responsive thereto the FMC application is configured to cause the operating mode for the hardware device to change to the master mode and communicate the change in operating mode to the FMC applications in the other hardware units.

5. The floating master controller according to claim 4, wherein when the hardware unit begins operating in the fault mode, the FMC application is configured to communicate to the FMC applications in the other hardware units that the hardware unit is operating in the fault mode.

6. The floating master controller according to claim 4, wherein the FMC application is configured to receive updated configuration data via the HMI indicative of a further hardware unit in the system being selected as the active master controller, and responsive thereto the FMC application is configured to communicate the selection of the further hardware unit being selected as the active master controller to the FMC application of the further hardware unit, whereby the hardware unit begins operating in the backup mode and the further hardware unit begins operating in the master mode.

7. The floating master controller according to claim 4, wherein the FMC application corresponds to a first FMC application, wherein the hardware unit includes a proportional-integral-derivative (PID) controller that controls a further function of the hardware unit, wherein the processor of the hardware unit is configured to execute a second FMC application that is configured to cause the PID controller to operate responsive to control signals received by the second FMC application from a third FMC application executing in a processor of a further hardware unit in the system that is operating in the master mode.

8. A hardware unit comprising the floating master controller according to claim 1, wherein the hardware unit includes a compressor, wherein the at least one mechanical function includes compressing a gas.

9. A system comprising the plurality of hardware units according to claim 8.

10. A method of operating a floating master controller comprising:

through operation of a processor of a hardware unit in a system of a plurality of hardware units in network communication with each other that are each capable of carrying out at least one mechanical function and that each include a respective floating master controller configured to operate in one of at least four modes in which the hardware unit is configured to operate, including a master mode, a backup mode, a tracking mode, and a fault mode:

the hardware unit operating in the backup mode and tracking one of the other hardware units operating in the master mode and thereby operating the at least one mechanical function of the hardware unit responsive to control data received from the other hardware unit that is operating in the master mode;

the hardware unit detecting that the other hardware unit being tracked is operating in the fault mode and responsive thereto, the hardware unit beginning operating in the master mode and not the backup mode, and thereby sending control data to the other hardware units in the system to control the at least one mechanical function in each of the other hardware units;

the hardware unit detecting that the other hardware unit previously tracked is operating in the master mode and responsive thereto, the hardware unit beginning operating again in the backup mode and tracking the other hardware unit;

the hardware unit receiving updated configuration data that causes the hardware unit to begin operating in the tracking mode, and thereby tracking the other hardware unit;

the hardware unit detecting that the other hardware unit being tracked is operating in the fault mode or not being available and responsive to the hardware unit being in the tracking mode, the hardware unit remains operating in the tracking mode;

the hardware unit detecting that the other hardware unit previously tracked or a different hardware unit in the system is operating in the master mode and responsive thereto, the hardware unit beginning tracking the other or different hardware unit that is operating in the master mode; and the hardware unit detecting an internal fault condition and responsive thereto the hardware unit beginning operating in the fault mode.

11. The method according to claim 10, further comprising through operation of the processor:

a floating master controller (FMC) application storing configuration settings in a memory regarding the configuration of the hardware unit and the system, and communicating control data between itself and further FMC applications executing in respective processors for each of the other hardware units in the system; and a master controller (MC) application controlling the at least one mechanical function of the hardware unit responsive to the configuration settings and the control data received from the FMC application, wherein the FMC application and the MC application are configured to cause the hardware unit to operate in one of the at least four modes, including the master mode, the backup mode, the tracking mode, and the fault mode, wherein when the hardware unit is operating in the master mode, the MC application is configured to send control data to the FMC application, which communicates the control data to the further FMC applications to control the at least one mechanical function in each of the other hardware units in the system, wherein when the hardware unit is operating in the backup mode: the MC application is configured to track one of the other hardware units in the system operating in the master mode and operate the at least one mechanical function of the hardware unit responsive to the control data received by the FMC application from one of the further FMC applications of one of the other hardware units that is operating in the master mode; and the FMC application and the MC application are configured to cause the hardware unit operating in the backup mode to begin operating in the master mode, responsive to the other hardware unit operating in the master mode entering the fault mode, and wherein when the hardware unit is operating in the tracking mode, the MC application is configured to track one of the other hardware units in the system operating in the master mode and operate the at least one mechanical function of the hardware unit responsive to the control data received by the FMC application from one of the further FMC applications of one of the other hardware units that is operating in the master mode.

12. The method according to claim 11, further comprising the FMC application providing data that enables a human machine interface (HMI) to display a graphical user interface that depicts the current operating mode for each of the hardware units in the system.

13. The method according to claim 12, further comprising:

the FMC application providing data that enables the HMI to depict at least one selection user interface element that enables an operator to provide an input to the HMI that selects which of the hardware units is to be the active master controller unit; and the FMC application receiving data via the HMI indicative of the hardware unit in the system being selected as the active master controller unit, and responsive thereto the FMC application causing the operating mode for the hardware device to change to the master mode and communicating the change in operating mode to the FMC applications in the other hardware units.

14. The method according to claim 13, further comprising the FMC application communicating to the FMC applications in the other hardware units that it is in the fault mode.

15. The method according to claim 13, further comprising the FMC application receiving updated data via the HMI indicative of a second hardware unit in the system being selected as the active master controller, and responsive thereto the FMC application communicating the selection of the second hardware unit being selected as the active master controller to an FMC application of the second hardware unit, whereby the hardware unit begins operating in the backup mode and the further hardware unit begins operating in the master mode.

16. The method according to claim 11, wherein the FMC application corresponds to a first FMC application, wherein the hardware unit includes a proportional-integral-derivative (PID) controller, further comprising through operation of the processor a second FMC application controlling the PID controller to operate responsive to control signals received by the second FMC application from a third FMC application executing in a processor of a further hardware unit in the system that is operating in the master mode.

17. The method according to claim 10, wherein the hardware unit includes a compressor, wherein the at least one mechanical function includes compressing a gas.

18. A non-transitory computer readable medium encoded with processor executable instructions that when executed by at least one processor, cause the at least one processor to carry out a method for operating a floating master controller according to claim 10.

* * * * *